United States Patent
Sakakibara et al.

(10) Patent No.: US 8,361,269 B2
(45) Date of Patent: Jan. 29, 2013

(54) METHOD FOR PUNCHING BEFORE PERFORMING ROTATED LAMINATION

(75) Inventors: Masami Sakakibara, Handa (JP); Shirou Fujimura, Miyoshi (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 367 days.

(21) Appl. No.: 12/843,147

(22) Filed: Jul. 26, 2010

(65) Prior Publication Data
US 2011/0024489 A1    Feb. 3, 2011

(30) Foreign Application Priority Data
Jul. 31, 2009    (JP) ................. 2009-179857

(51) Int. Cl.
*B32B 38/00* (2006.01)
*B32B 38/04* (2006.01)
(52) U.S. Cl. ........ 156/252; 156/250; 156/253; 156/256; 156/261; 156/264
(58) Field of Classification Search .............. 156/250, 156/252, 253, 254, 256, 261, 262, 264, 510, 156/513, 516–521
See application file for complete search history.

(56) References Cited

U.S. PATENT DOCUMENTS

| | | | | |
|---|---|---|---|---|
| 3,107,566 A | * | 10/1963 | Archer | .............. 83/33 |
| 3,210,824 A | * | 10/1965 | Zimmerle | .............. 29/33 R |
| 5,915,750 A | * | 6/1999 | Usher et al. | .............. 29/596 |
| 2009/0011965 A1 | | 1/2009 | Kato et al. | |
| 2009/0301161 A1 | | 12/2009 | Fujimura et al. | |

FOREIGN PATENT DOCUMENTS

JP    2004-153928    5/2004

OTHER PUBLICATIONS

Machine Translation of JP 2004-153928.*
U.S. Appl. No. 12/898,115 to Shirou Fujimura et al., filed Oct. 5, 2010.

* cited by examiner

*Primary Examiner* — Mark A Osele
*Assistant Examiner* — Christopher C Caillouet
(74) *Attorney, Agent, or Firm* — Greenblum & Bernstein, P.L.C.

(57) ABSTRACT

A movable punch punches a plate piece from an original material sheet. The punched plate piece is rotated relative to and laminated onto another plate piece. A plurality of projections are formed on the outer circumference of each plate piece. The movable punch has a plurality of projection forming blades, the number of which is greater than the number of the projections of the plate pieces. Prior to the punching of the plate piece by means of the movable punch, blank holes for nullifying the formation of the projections are formed in the original material sheet at positions that correspond to projection forming blades. Further, as the punching of the plate pieces from the original material sheet progresses, the positions of the blank holes are changed.

9 Claims, 16 Drawing Sheets

METHOD FOR PUNCHING BEFORE PERFORMING ROTATED LAMINATION

BACKGROUND OF THE INVENTION

The present invention relates to a method for punching rotor iron core pieces for use in a laminated rotor core of an electric motor or stator core pieces for use in a laminated stator core of an electric motor.

For example, Japanese Laid-Open Patent Publication No. 2004-153928 discloses such a method for punching. In accordance with this method, a belt-like original material sheet 91 is fed in the longitudinal direction, and stator core pieces 92 are consecutively punched from the original material sheet 91 as shown in FIGS. 20 and 21. A plurality of projections 93 are formed on the outer circumference of each stator core piece 92. Each projection 93 has an attachment hole 94 for receiving a bolt. A plurality of slits 95 for receiving coils are formed on the inner circumference of the stator core 92. The slits 95 are formed at predetermined angular intervals. A magnetic pole portion 96 is formed between each pair of adjacent slits 95.

The thus punched stator core pieces 92 are laminated onto and fixed to each other, so that a laminated stator core for an electric motor is formed. In this case, variations in the flatness and thickness of the original material sheet 91 can adversely affect the lamination state of the laminated stator core. To prevent this, a rotated lamination method has been employed. In accordance with the rotated lamination method, punched stator core pieces 92 are laminated while the center angle of each stator core piece 92 is shifted in relation to other stator core pieces 92, so as to cancel out variations in flatness.

The method for punching stator core pieces 92 according to Japanese Laid-Open Patent Publication No. 2004-153928 will now described in detail. At a station prior to the station shown in FIG. 20, the original material sheet 91 is punched to form slits 95 and magnetic pole portions 96 on the inner circumference of a stator core piece 92. Subsequently, at the station shown in FIG. 20, the original material sheet 91 is punched to form openings 97 and attachment holes 94 for receiving bolts in the outer periphery of the stator core piece 92. The openings 97 are substantially U-shaped in a plan view so as to form the projections 93. Next, at a station shown in FIG. 21, the original material sheet 91 is punched to form arcuate portions 98, which define the outer circumference of the stator core piece 92. Each arcuate portion 98 is formed to connect proximal ends of an adjacent pair of the openings 97.

As described above, according to the method disclosed in the publication, the openings 97 for forming the projections 93 and the arcuate portions 98 for defining the outer circumference of the stator core piece 92 are formed through punching at different stations, while the original material sheet 91 is being fed. Therefore, the punching positions on the original material sheet 91 are likely to be displaced between the stations. Specifically, each arcuate portion 98 might fail to connect the proximal ends of the corresponding adjacent pair of the openings 97. In this case, since a coupling portion such as a micro-joint is formed between the arcuate portion 98 and the opening 97, the stator core piece 92 cannot be separated from the original material sheet 91. Even if the stator core piece 92 is separated from the original material sheet 91, a blur remains as traces of the micro-joint. This can hinder subsequent processes.

To prevent such drawbacks, the proximal ends of the openings 97 need to be extended further radially inward than the outer circumference of the stator core piece 92 as shown in FIG. 22. However, in this case, a recess 93*a* is formed at each proximal end of the projections 93 at the outer circumference of the stator core piece 92. Excessive stress thus tends to be concentrated on each recess 93*a*. This is undesirable in view of the strength. Further, since each projection 93 is formed by the U-shaped opening 97, the proximal portion (base portion) of the projection 93 is likely to be bent. This can adversely affect the assembly accuracy of the rotated lamination of the stator core pieces 92.

SUMMARY OF THE INVENTION

Accordingly, it is an objective of the present invention to provide a method for punching before rotated lamination, which method allows a plate piece having a plurality of projections at the inner or outer circumference to be punched from a thin plate-like original material without the necessity for forming recesses at the proximal ends of the projections.

To achieve the foregoing objective and in accordance with one aspect of the present invention, a method for punching before performing rotated lamination is provided. A plate piece having on a circumference thereof a plurality of projections is punched out from a thin plate-like original material before the plate piece is rotated relative to and laminated onto another plate piece. The method includes: using a plurality of projection forming blades the number of which is greater than the number of the projections of the plate piece; before punching out the plate piece from the original material, forming in the original material one or more blank holes for nullifying the formation of one or more of the projections at positions corresponding to one or more of the projection forming blades; and changing the position of the blank hole as the punching of the plate piece from the original material progresses.

DETAILED DESCRIPTION OF THE PREFERRED EMBODIMENTS

Hereinafter, one embodiment of the present invention will be described with reference to FIGS. 1 to 19. Specifically, a method for punching rotor core pieces forming a laminated rotor core of an electric motor and a method for punching stator core pieces forming a laminated stator core will be described.

First, rotor core pieces and stator core pieces, which are punched by the punching method of the present embodiment, and a laminated rotor core and a laminated stator core formed by laminating the core pieces, which are plate pieces, will be described.

Figure 18:
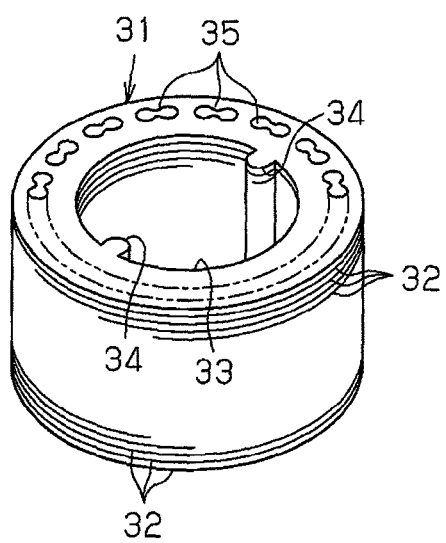
FIG. 18 is a perspective view illustrating a laminated rotor core formed by laminating a plurality of the rotor core pieces.

As shown in FIG. 18, a laminated rotor core 31 is formed by laminating rotor core pieces (first plate pieces) 32. Specifically, the rotor core pieces 32 are laminated while the phase of each rotor core piece 32 is rotated relative to the adjacent rotor core piece 32 by a predetermined angle (180 degrees), and fixed to the adjacent core piece 32. The rotor core pieces 32 are formed of magnetic steel plates such as silicon steel plates, and have a thin disk-like shape. The rotor core piece 32 has at its center a shaft hole 33, in which a rotary shaft is inserted and fixed. A pair of key-shaped projections 34 is formed on the inner circumference of the shaft hole 33, while being spaced by 180 degrees. The projections 34 engage with grooves on the rotary shaft, thereby determining the position of the laminated rotor core 31 with respect to the rotary shaft. The annular portion of the rotor core pieces 32 has storage holes 35 for storing permanent magnets.

Figure 19:
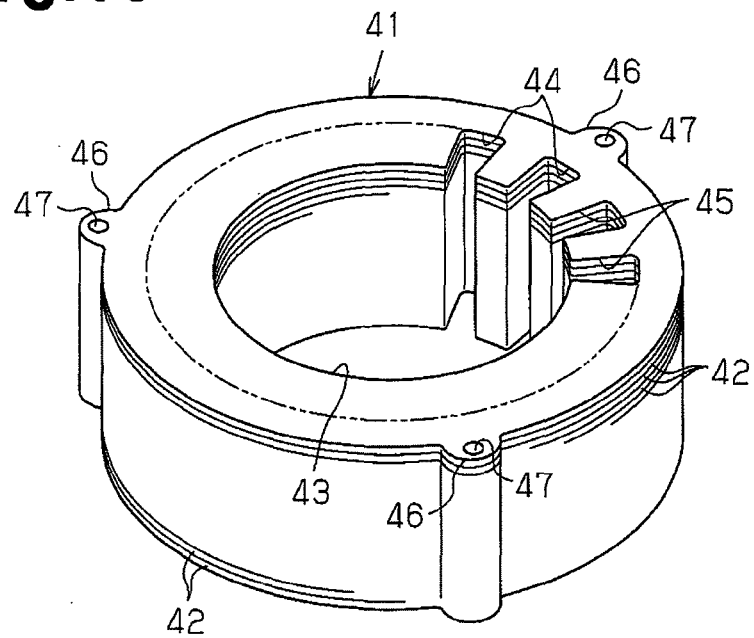
FIG. 19 is a perspective view illustrating a laminated stator core formed by laminating a plurality of the stator core pieces.
Figure 20:
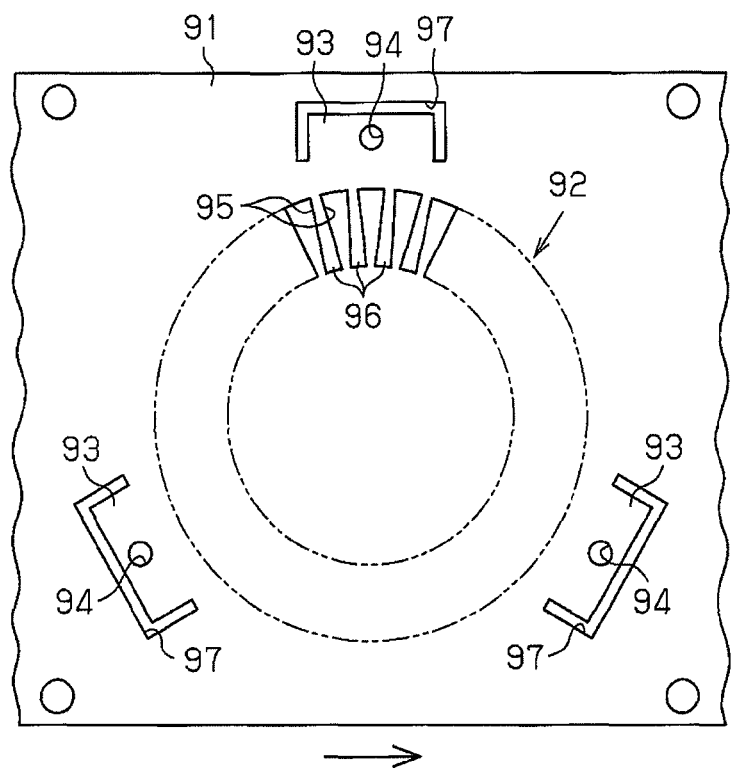
FIG. 20 is a plan view illustrating an original material in which openings for forming projections are formed at one station by means of a conventional method for punching a stator core piece.
Figure 21:
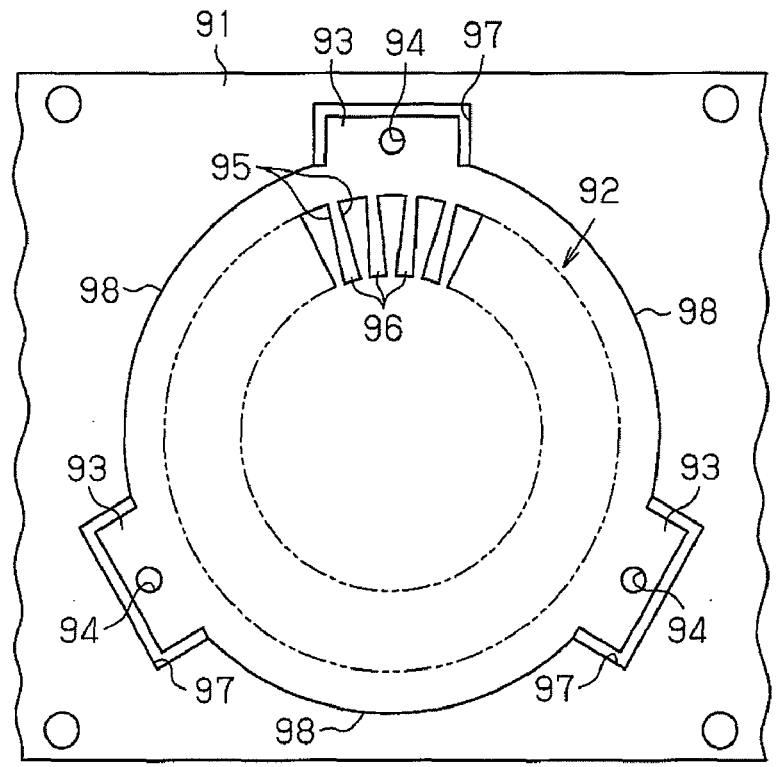
FIG. 21 is a plan view showing the original material processed in a station subsequent to the station of FIG. 20.
Figure 22:
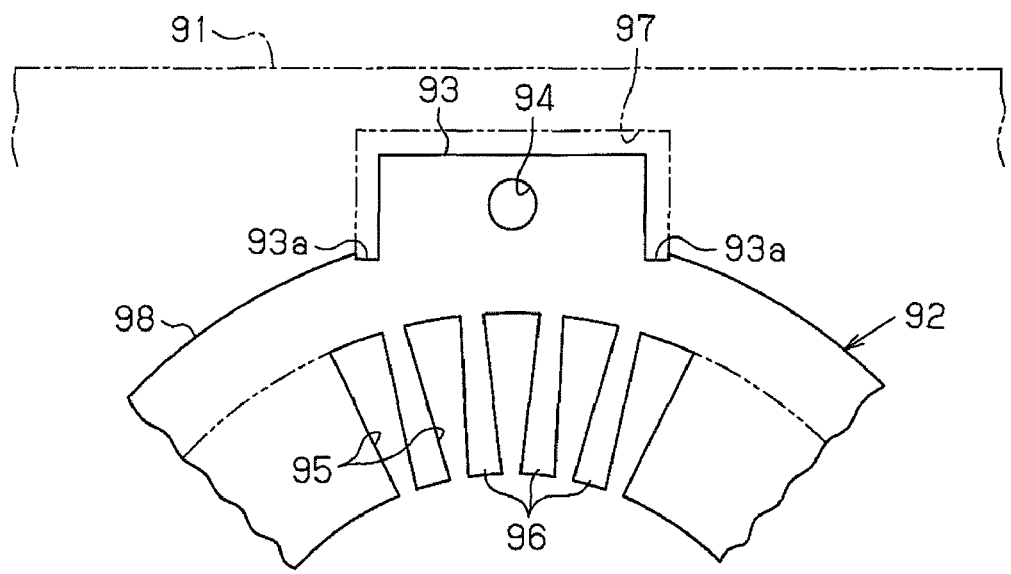
FIG. 22 is an enlarged partial plan view showing the stator core piece.

As shown in FIG. 19, a laminated stator core 41 is formed by laminating stator core pieces (second plate pieces) 42 and fixing the stator core pieces 42 together. The stator core pieces 42 are formed of magnetic steel plates such as silicon steel plates, and have a thin disk-like shape. The stator core pieces 42 have at the center thereof an accommodation hole 43 for rotatably accommodating the laminated rotor core 31. A plurality of slits 44 for coils is formed on the inner circumference of the accommodation hole 43. The slits 44 are formed at equal angular intervals. A magnetic pole portion 45 is formed between each adjacent slits 44. The exciting coils are wound about the magnetic portions 45. Three projections 46 are formed at equal intervals on the outer circumference of the stator core pieces 42. An attachment hole 47 is formed in each projection 46. Bolts that are inserted in the attachment holes 47 of the projections 46 fix the laminated stator core 41 to a case.

Next, a processing system for punching the rotor core pieces 32 and the stator core pieces 42, and a method for punching using the processing system will be described.

Figure 1:
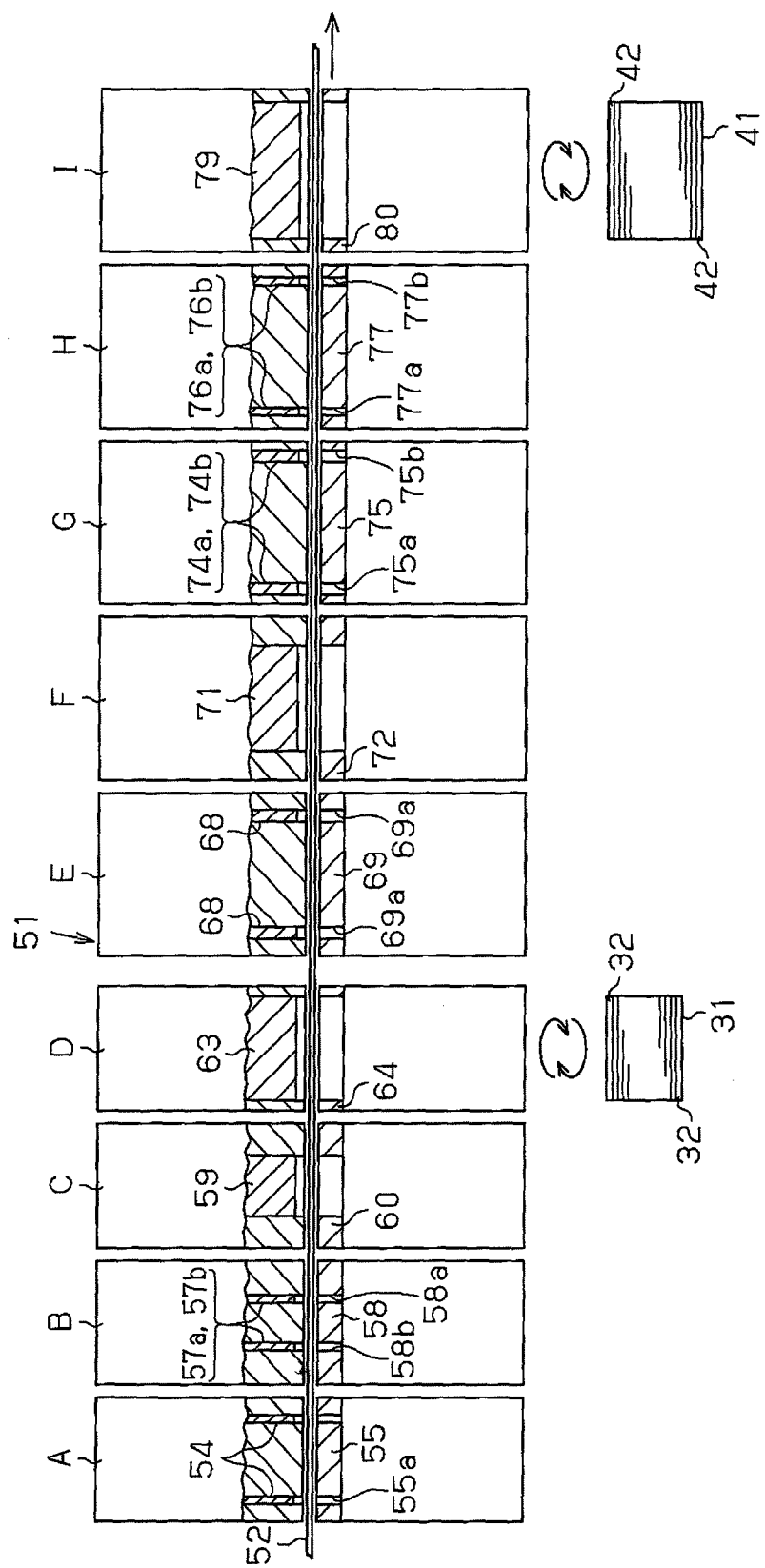
FIG. 1 is a front view schematically showing a processing system used for a method according to one embodiment of the present invention, the method relating to punching of rotor core pieces and stator core pieces of an electric motor.

As shown in FIG. 1, the processing system 51 includes first to ninth stations A to I. An original material sheet 52, which is a thin belt-like silicon steel plate, is moved intermittently along its longitudinal direction to successively pass through the first to ninth stations A to I.

Figure 2:
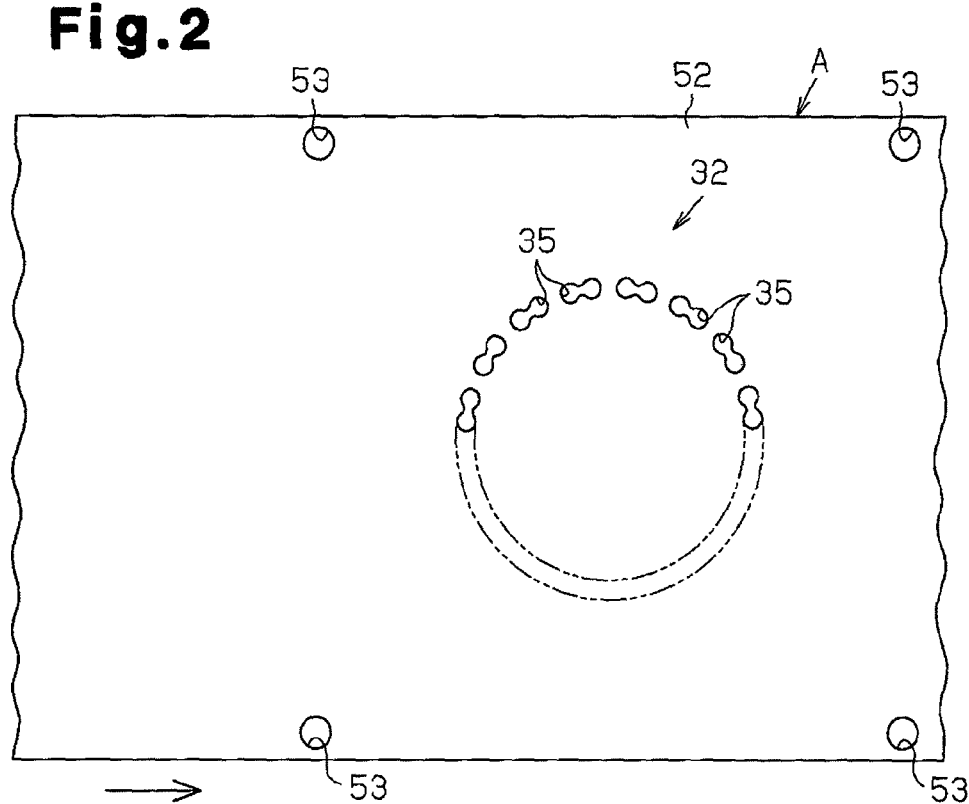
FIG. 2 is a plan view showing original material after being processed at a first station.

At a station prior to the first station A, original material reference holes 53 shown in FIG. 2 are formed at both sides of the sheet 52 at a predetermined interval by a punching device. Based on the reference holes 53, the position of a process section on the original material sheet 52 is determined in relation to each of the stations A to I. At the first to fourth stations A to D, which consist a front-end process, the rotor core piece 32 is punched from the original material sheet 52. At the fifth to ninth stations E to I, which consist a back-end process, the stator core piece 42 is punched from the remainder of the original material sheet 52.

The first to fourth stations A to D and the method for punching the rotor core piece 32 will now be described.

As shown in FIGS. 1 and 2, the first station A includes movable punches 54 for punching the storage holes 35 of the rotor core piece 32, and a fixed die 55 that includes blades 55a corresponding to the movable punches 54. With the original material sheet 52 placed between the movable punches 54 and the fixed die 55, the movable punches 54 are reciprocated relative to the fixed die 55. This simultaneously punches the storage holes 35 at the process section on the original material sheet 52.

Figure 3:
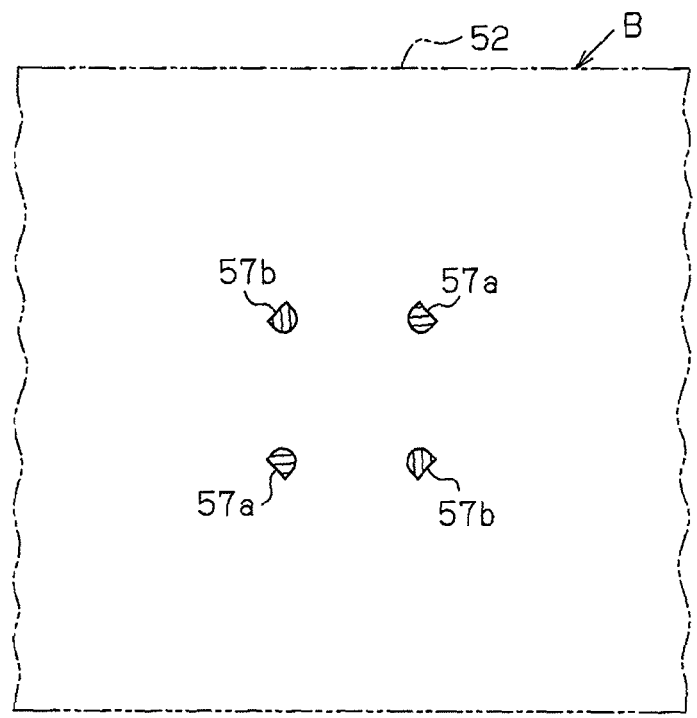
FIG. 3 is a transverse cross-sectional view showing a movable punch used in a second station.

As shown in FIGS. 1, 3 and 4, the second station B includes a plurality of movable punches 57a, 57b, and a fixed die 58 that includes blades 58a, 58b corresponding to the movable punches 57a, 57b. At the second station B, before the shaft hole 33 is formed in the rotor core piece 32, a plurality of blank holes 56a, 56b are punched at positions on the inner circumference of the shaft hole 33, which will yet to be formed. The cross-sectional shapes of the movable punches 57a, 571 and the blades 58a, 58b of the fixed die 58 are the same as or a similar figure slightly larger than the shape of the projections 34 of the rotor core piece 32 in a plan view. The movable punches 57a, 57b and the blades 58a, 58b of the fixed die 58 are arranged on the same circumference at predetermined angular intervals. The number of the movable punches 57a, 57b and the number of the blades 58a, 58b of the fixed die 58 are each a multiple of the number of the projections 34 of the rotor core piece 32. In the present embodiment, the number of the projections 34 is two, and the number of the movable punches 57a, 57b and the number of the blades 58a, 58b of the fixed die 58 are four, which is the double of two. The movable punches 57a, 57b and the blades 58a, 58b are arranged at an angular interval of 90 degrees.

The process section on the original material sheet 52, in which the storage holes 35 have been punched, is placed between the movable punches 57a, 57b and the fixed die 58. In this state, the movable punches 57a, or every other punch, are reciprocated relative to the blades 58a of the fixed die 58. This action punches a pair of blank holes 56a spaced by 180 degrees on the process section on the original material sheet 52, thereby forming a first pattern process section P1. The blank holes 56a are used at the third station C to prevent projections 34 from being formed at the corresponding positions when the shaft hole 33 and projections 34 of the rotor core piece 32 are formed by a movable punch 59 and a fixed die 60. That is, the blank holes 56a nullify the formation of projections 34 by projection forming blades 61a on the movable punches 59 and the corresponding fixed die 60.

Figure 4A:
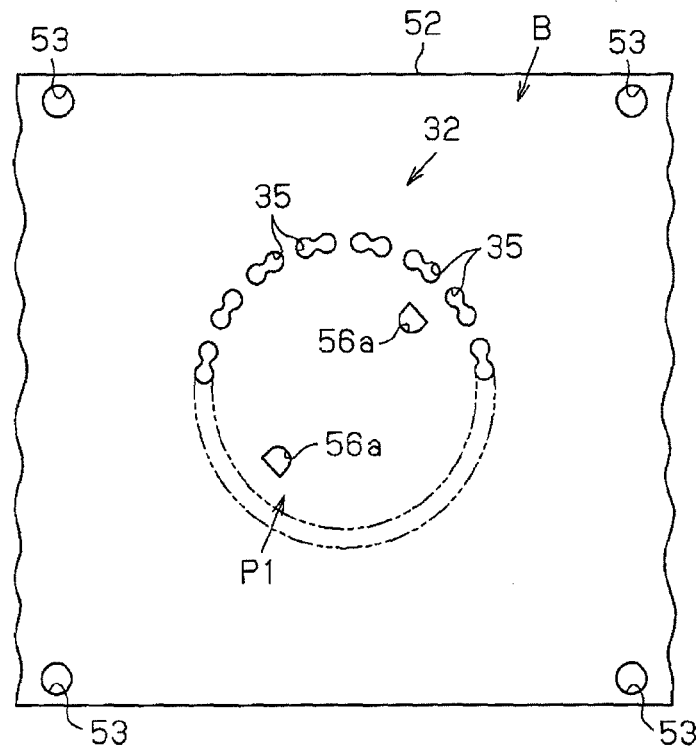
FIG. 4A is a plan view showing the original material in which blank holes have been punched in a first pattern at the second station.
Figure 4B:
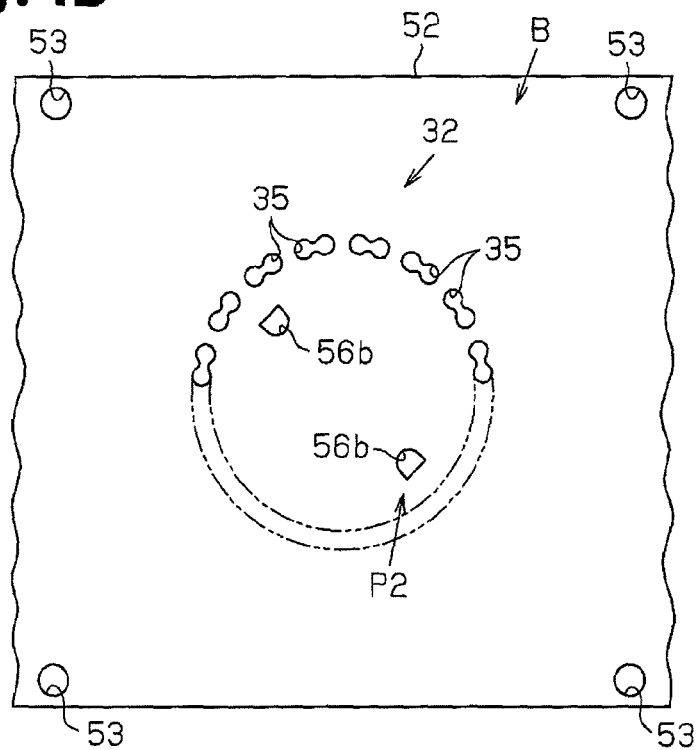
FIG. 4B is a plan view showing the original material in which blank holes have been punched in a second pattern at the second station.

Next, the subsequent process section on the original material sheet 52, in which the storage holes 35 have been punched, is placed between the movable punches 57a, 57b and the fixed die 58 of the second station B. In this state, the remaining movable punches 57b are reciprocated relative to the blades 58b of the fixed die 58. This action punches a pair of blank holes 56b on the process section on the original material sheet 52 at positions displaced by 90 degrees from the blank holes 56a of the first pattern process section P1 as shown in FIG. 4B, thereby forming a second pattern process section P2. The blank holes 56b nullifies the formation of projections 34 by the other projection forming blades 61b of the movable punch 59 and the corresponding fixed die 60, when the shaft hole 33 and the projections 34 of the rotor core piece 32 are formed at the third station C.

In this manner, at the second station B, the original material sheet 52 is intermittently fed by a predetermined pitch, and the movable punches 57a, or every other punch, and the remaining pair of the movable punches 57b are actuated alternately. This action alternately forms the blank holes 56a of the first pattern process section P1 shown in FIG. 4A, and the blank holes 56b of the second pattern process section P2 shown in FIG. 4B, which holes 56b have a phase shifted from the blank holes 56a by 90 degrees.

Figure 5:
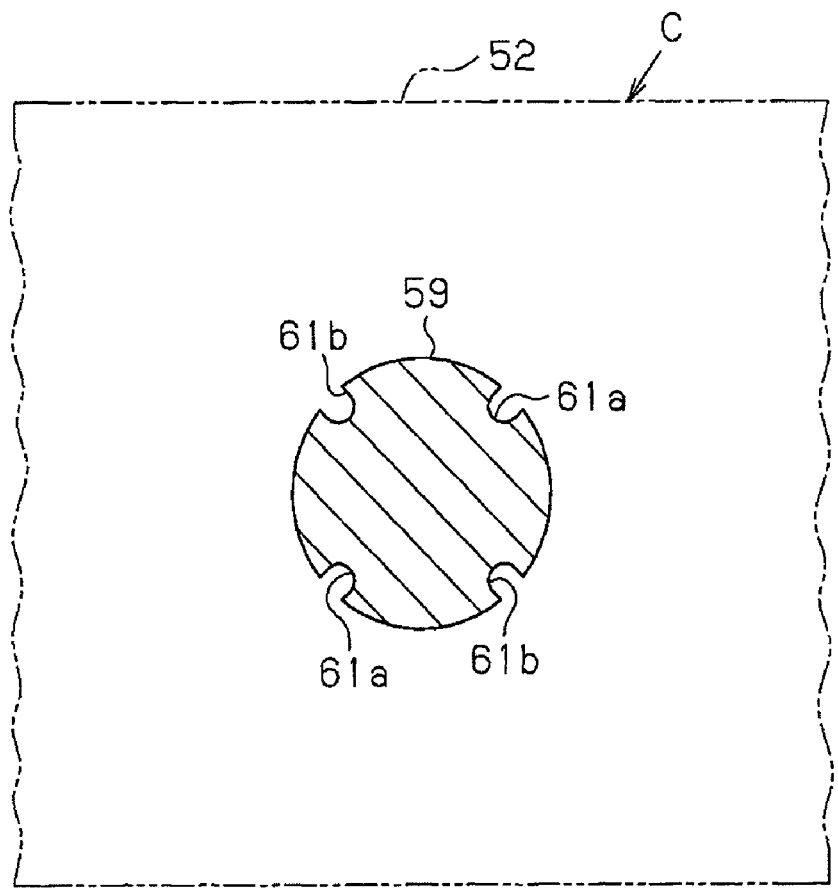
FIG. 5 is a transverse cross-sectional view showing a movable punch used in a third station.

As shown in FIGS. 1, 5, and 6, the third station C includes a substantially columnar movable punch 59 and a fixed die 60, which corresponds to the movable punch 59. At the third station C, the shaft hole 33 and the projections 34 of the rotor core piece 32 are simultaneously punched. Projection forming blades 61a, 61b are formed in the outer circumferential surface of the movable punch 59 at equal angular intervals. The projection forming blades 61a, 61b are grooves and form the projections 34. In this case, the number of the projection forming blades 61a, 61b is a multiple of the number of the projections 34 of the rotor core piece 32. In this embodiment, the number of the projections 34 is two, and the number of the projection forming blades 61a, 61b is four, which is a multiple of two. The projection forming blades 61a, 61b are arranged at an angular interval of 90 degrees.

Figure 6A:
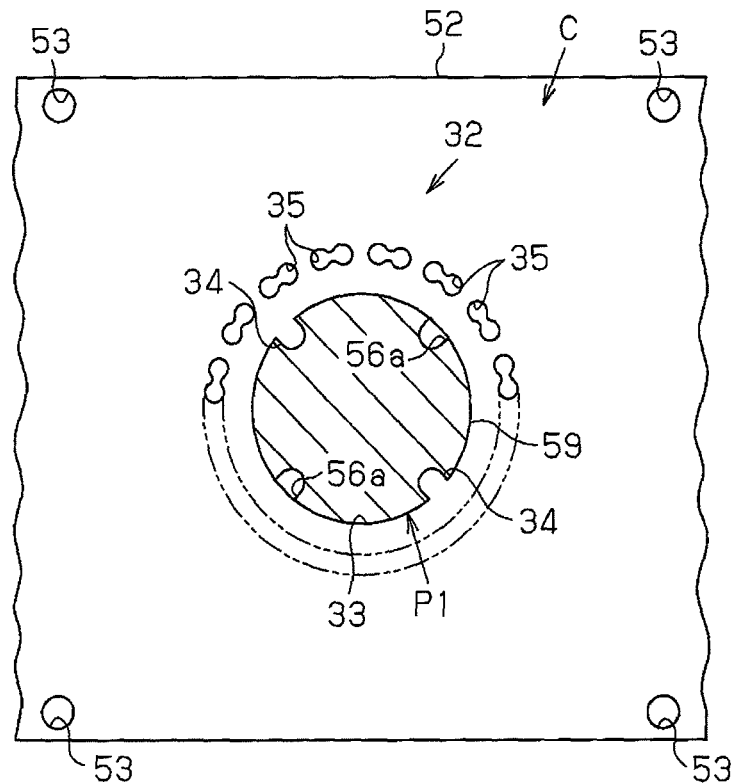
FIG. 6A is a plan view showing the original material in which a shaft hole has been punched with a movable punch at the third station.

The first pattern process section P1 on the original material sheet 52, in which the blank holes 56a have been punched, is placed between the movable punch 59 and the fixed die 60 of the third station C. In this state, the movable punch 59 is reciprocated relative to the fixed die 60. This action punches the shaft hole 33 and the projections 34 of the rotor core piece 32 in the first pattern process section P1 on the original material sheet 52, as shown in FIG. 6A. In this case, as shown in FIGS. 5 and 6A, the blank holes 56a have been formed in advance at positions that correspond to the projection forming blades 61a on the movable punch 59 in the first pattern process section P1. Accordingly, the formation of the projections 34 by the projection forming blades 61a is nullified. The projections 34 are therefore not formed at the parts of the blank holes 56a. As a result, the other projection forming blades 61b of the movable punch 59 form a pair of projections 34 spaced by an interval of 180 degrees on the inner circumference of the shaft hole 33 of the rotor core piece 32.

Figure 6B:
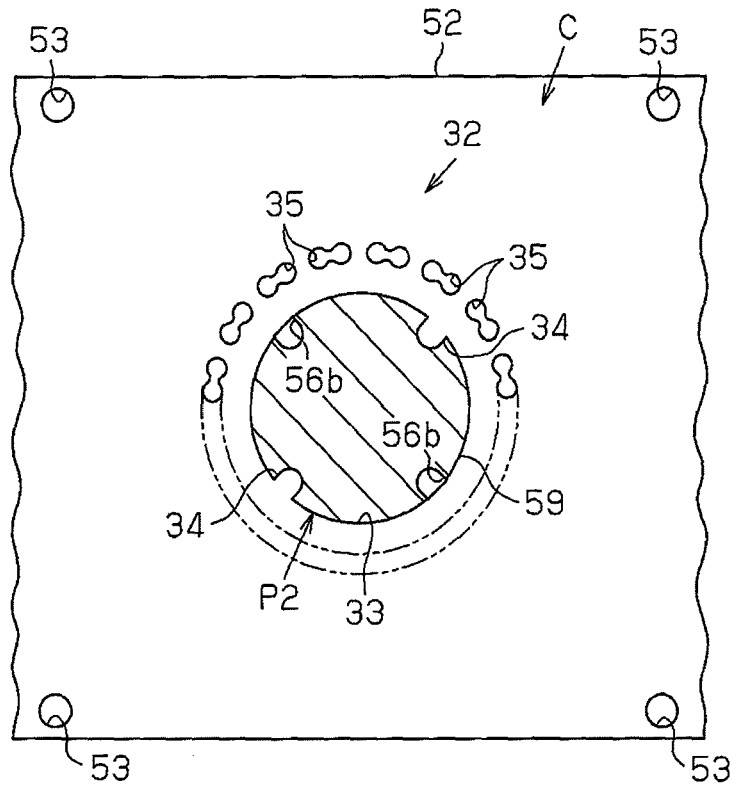
FIG. 6B is a plan view showing the original material in which a shaft hole has been punched with a movable punch at the third station.

Further, as the original material sheet 52 is moved, the second pattern process section p2 on the original material sheet 52 is placed between the movable punch 59 and the fixed die 60 of the third station C. In this state, the movable punch 59 is reciprocated relative to the fixed die 60. This action punches the shaft hole 33 and the projections 34 of the rotor core piece 32 in the second pattern process section P2 on the original material sheet 52, as shown in FIG. 6B. In this case, as shown in FIGS. 5 and 6B, the blank holes 56b have been formed in advance at positions that correspond to the other projection forming blades 61b on the movable punch 59 in the second pattern process section P2. Accordingly, the formation of the projections 34 by the projection forming blades 61b is nullified. As a result, the projection forming blades 61a of the movable punch 59 form a pair of projections 34 on the inner circumference of the shaft hole 33 of the rotor core piece 32, at positions displaced by 90 degrees from the first pattern process section P1.

Figure 7A:
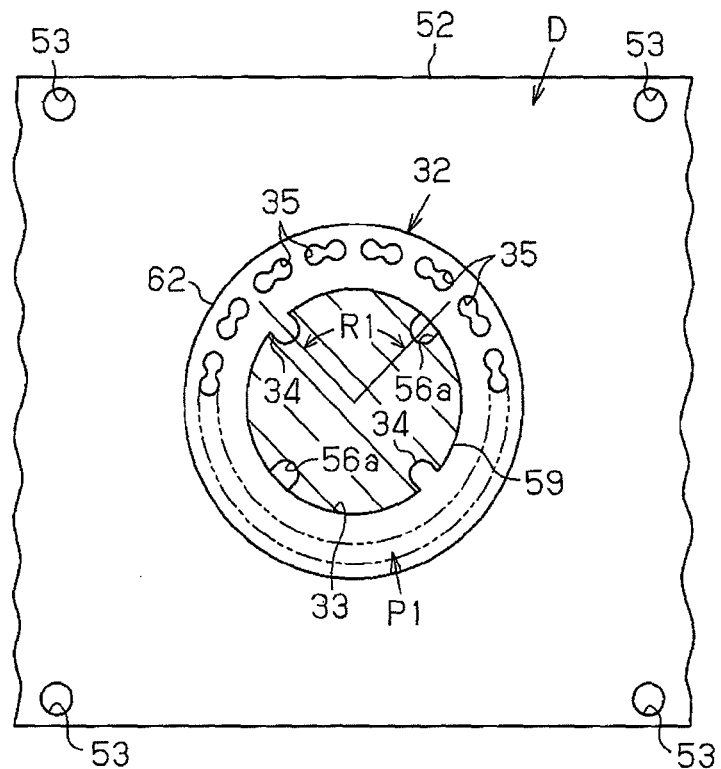
FIG. 7A is a plan view showing the original material in which a rotor core piece has been punched with a movable punch at a fourth station.
Figure 7B:
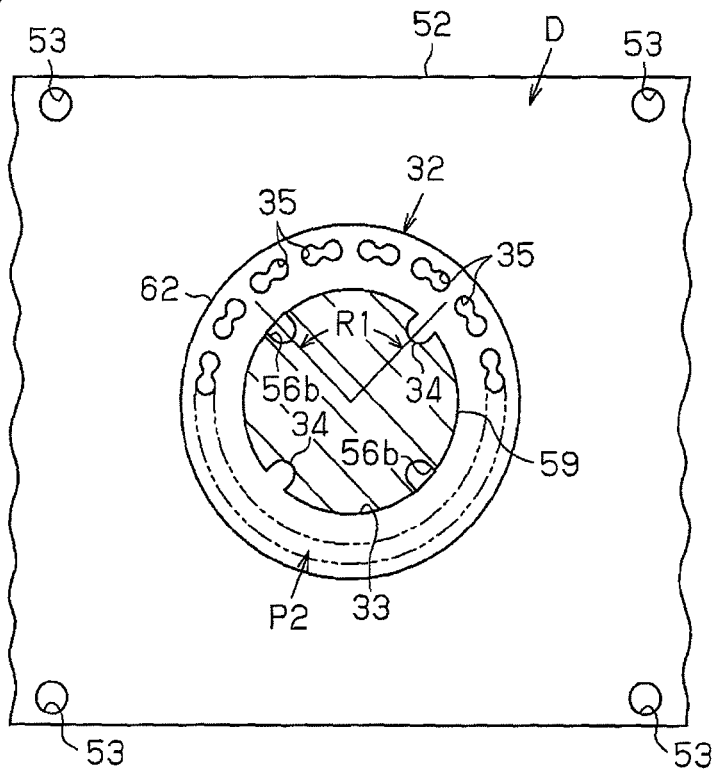
FIG. 7B is a plan view showing the original material in which a rotor core piece has been punched with a movable punch at a fourth station.

As shown in FIGS. 1, 7A and 7B, the fourth station D includes a columnar movable punch 63 and a fixed die 64, which corresponds to the movable punch 63. At the fourth station D, an outer circumference 62 of the rotor core piece 32 is punched in the original material sheet 52. The first pattern process section P1 on the original material sheet 52 is placed between the movable punch 63 and the fixed die 64 of the fourth station D. In this state, the movable punch 63 is reciprocated relative to the fixed die 64. This action forms the outer circumference 62 of the rotor core piece 32 as shown in FIG. 7A, so that the disk-shaped rotor core piece 32 is punched out of the original material sheet 52.

Further, as the original material sheet 52 is moved, the second pattern process section P2 on the original material sheet 52 is placed between the movable punch 59 and the fixed die 60 of the fourth station D. In this state, the movable punch 59 is reciprocated relative to the fixed die 60. This action forms the outer circumference 62 of the rotor core piece 32 as shown in FIG. 7B, so that the rotor core piece 32 is punched out of the original material sheet 52.

The punched rotor core piece 32 is sent from the fixed die 64 to another process. In the other process, the rotor core piece 32 is rotated in one direction or in the opposite direction by a predetermined angle R1 (90 degrees in the present embodiment) relative to another adjacent rotor core piece 32, and laminated onto this adjacent core piece 32. The laminated body is compressed with a strong force in the direction of the lamination by means of a press. Accordingly, the rotor core pieces 32 closely contact each other and are held in close contact by fixing means. The rotated lamination of the rotor core pieces 32 is thus performed to obtain the laminated rotor core 31.

In this manner, the rotor core pieces 32 are punched out of the first pattern process section P1 and the second pattern process section P2 on the original material sheet 52, and the rotor core pieces 32 are laminated while being rotated by 90 degrees in opposite directions. The projections 34 on the inner circumference of the rotor core pieces 32 are therefore located at the same positions, so that the laminated rotor core 31 shown in FIG. 18 is formed. Thereafter, a rotary shaft is inserted into the shaft hole 33 such that the projections 34 of the shaft hole 33 engage with the grooves of the rotary shaft. The rotary shaft is thus fixed to the rotor core pieces 32.

In the processing system 51, when simultaneously punching the shaft hole 33 and the projections 34 in the rotor core piece 32 by the movable punch 59 of the third station C, the number of the formed projections 34 is limited by the blank holes 56a, 56b. That is, at the first and second pattern process sections P1, P2, the number of the blank holes 56a, 56b is set to the number obtained by subtracting the number of the projections 34 from the number of the projection forming blades 61a, 61b of the movable punch 59 (in the present embodiment, 4−2=2). A pair of the projection forming blades 61a or a pair of the projection forming blades 61b correspond to the blank holes 56a or the blank holes 56b formed on the original material sheet 52. The projection forming blades 61a or 61b nullify the formation of the projections 34, so that only two projections 34 are formed.

Figure 8:
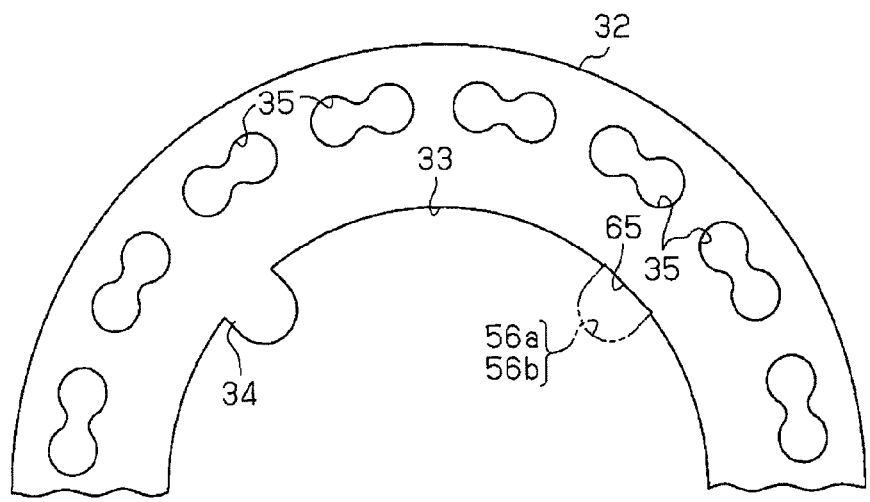
FIG. 8 is an enlarged partial plan view showing the rotor core piece punched at the first to fourth stations.

Therefore, unlike Patent Document 1, when the blank holes 56a, 56b are lapped with the shaft hole 33 so that the blank holes 56a, 56b formed at the second station B and the shaft hole 33 formed in the third stage C are connected to each other, no recesses are formed at the proximal portions of each projection 34 as shown in FIG. 8. Thus, when the rotor core pieces 32 are laminated while being rotated to form the laminated rotor core 31, and the laminated projections 34 are engaged with the grooves on the rotary shaft to fix the position of the laminated rotor core 31 relative to the rotary shaft, excessive stress is not concentrated at the proximal portions of the projections 34.

When the blank holes 56a, 56b and the shaft hole 33 are lapped with each other, recesses 65 are formed at positions corresponding to the blank holes 56a, 56b that have nullified the formation of the projections 34 on the inner circumferential surface of the shaft hole 33 of the rotor core pieces 32, as shown in FIG. 8. However, unlike the proximal portions of the projections 34, the recesses 65 do not contribute to the fixation of the laminated rotor core 31 and the rotary shaft. Therefore, stress is not concentrated at the recesses 65.

Next, the fifth to ninth stations E to I for punching the stator core pieces 42 in the processing system 51 will be described.

Figure 9:
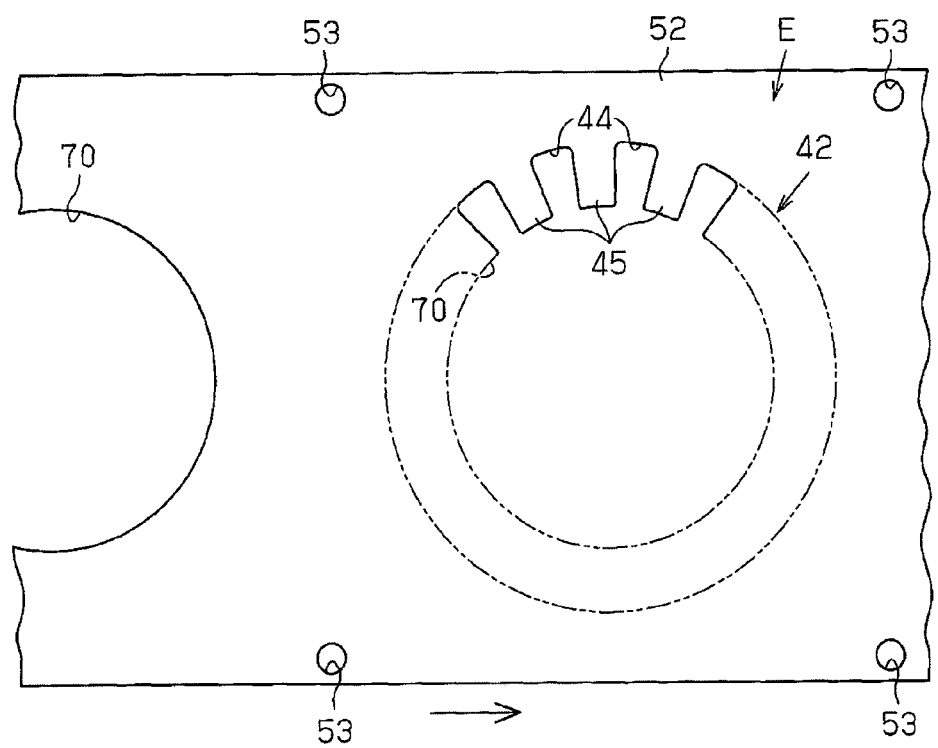
FIG. 9 is a plan view showing the original material in which slits have been punched at a fifth station.

As shown in FIGS. 1 and 9, the fifth station E includes movable punches 68 for punching the slits 44 of the stator core piece 42 and a fixed die 69 that corresponds to the movable punches 68. The original material sheet 52, from which the rotor core piece 32 has been punched out at the fourth station D, is placed between the movable punch 68 and the fixed die 69. In this state, the movable punch 68 is reciprocated relative to the fixed die 69. This punches out the slits 44 for coils at predetermined angular intervals in the vicinity of a hollowed hole 70 on the original material sheet 52. At the same time, a magnetic portion 45 is formed between each adjacent pair of the slits 44.

Figure 10:
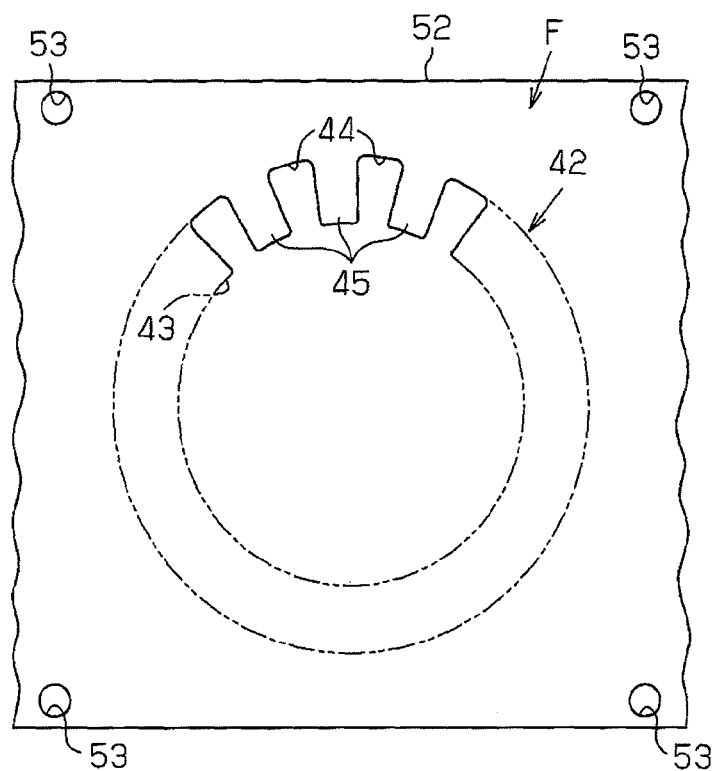
FIG. 10 is a plan view showing the original material in which an accommodation hole has been punched at a sixth station.

As shown in FIGS. 1 and 10, the sixth station F includes a columnar movable punch 71 and a fixed die 72, which corresponds to the movable punch 71. The movable punch 71 punches the accommodation hole 43 in the center of the stator core piece 42. A process section of the original material sheet 52 in which the slits 44 and the magnetic portions 45 are formed at the fifth station E is placed between the movable punch 71 and the fixed die 72 of the sixth station F. In this state, the movable punch 71 is reciprocated relative to the fixed die 72. This forms the accommodation hole 43, which is slightly larger than the outer diameter of the rotor core piece 32, inside the slits 44 and the magnetic portions 45 of the original material sheet 52.

Figure 11:
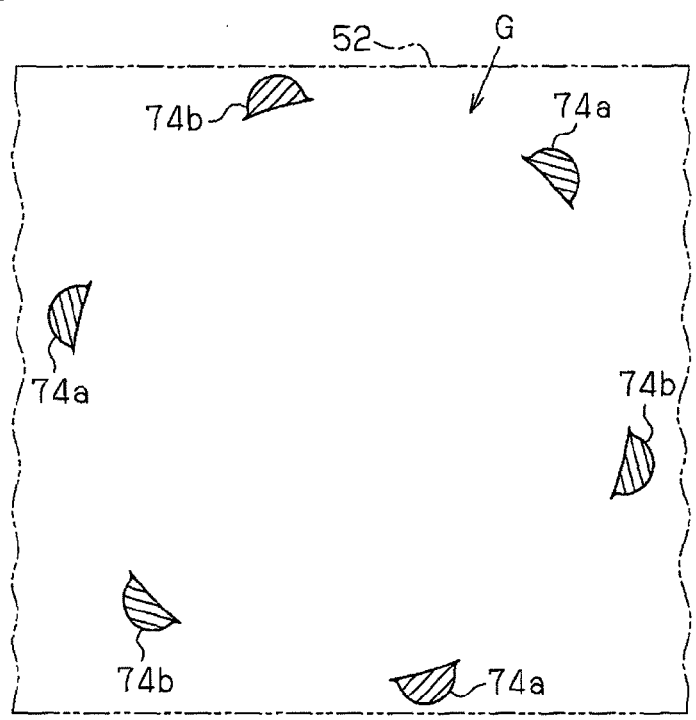
FIG. 11 is a transverse cross-sectional view showing a movable punch used in a seventh station.

As shown in FIGS. 1, 11 and 12, the seventh station G includes a plurality of movable punches 74a, 74b, and a fixed die 75 that includes blades 75a, 75b corresponding to the movable punches 74a, 74b. At the seventh station G, before the outer circumference of the stator core piece 42 is formed, a plurality of blank holes 73a, 73b are punched at positions on the outer circumference of the stator core piece 42, which will yet to be formed. The cross-sectional shapes of the movable punches 74a, 74b and the blades 75a, 75b of the fixed die 75 are the same as or a similar figure slightly larger than the shape of the projections 46 of the stator core piece 42 in a plan view. The movable punches 74a, 74b and the blades 75a, 75b are arranged on the same circumference at predetermined angular intervals. The number of the movable punches 74a, 74b and the number of the blades 75a, 75b are each a multiple of the number of the projections 46 of the stator core piece 42. In the present embodiment, the number of the projections 46 is three, and the number of the movable punches 74a, 74b and the number of the blades 75a, 75b are six, which is the double of three. The movable punches 74a, 74b and the blades 75a, 75b are arranged at angular intervals of 60 degrees.

The process section on the original material sheet 52, in which the accommodation hole 43 has been punched, is placed between the movable punches 74a, 74b and the fixed die 75. In this state, the three movable punches 74a, or every other punch, are reciprocated relative to the blades 75a of the fixed die 75. This action punches three blank holes 73a spaced by equal angular intervals on the process section on the original material sheet 52, thereby forming a third pattern process section P3. The blank holes 73a nullify the formation of projections 46 by projection forming blades 81a on the movable punch 79, when the outer circumference and the projections 46 of the stator core piece 42 are formed by the movable punch 79.

Figure 12A:
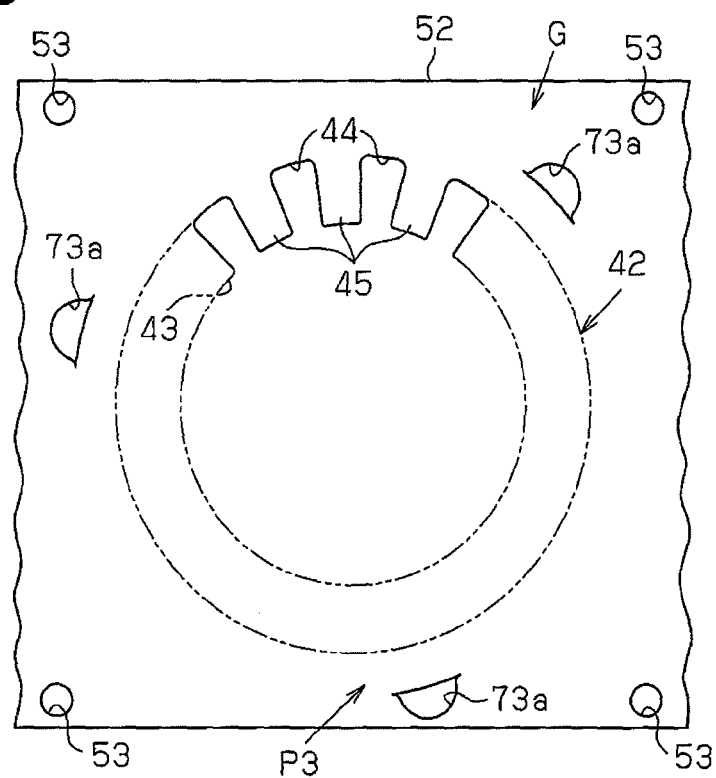
FIG. 12A is a plan view showing the original material in which blank holes have been formed in a third pattern at the seventh station.
Figure 12B:
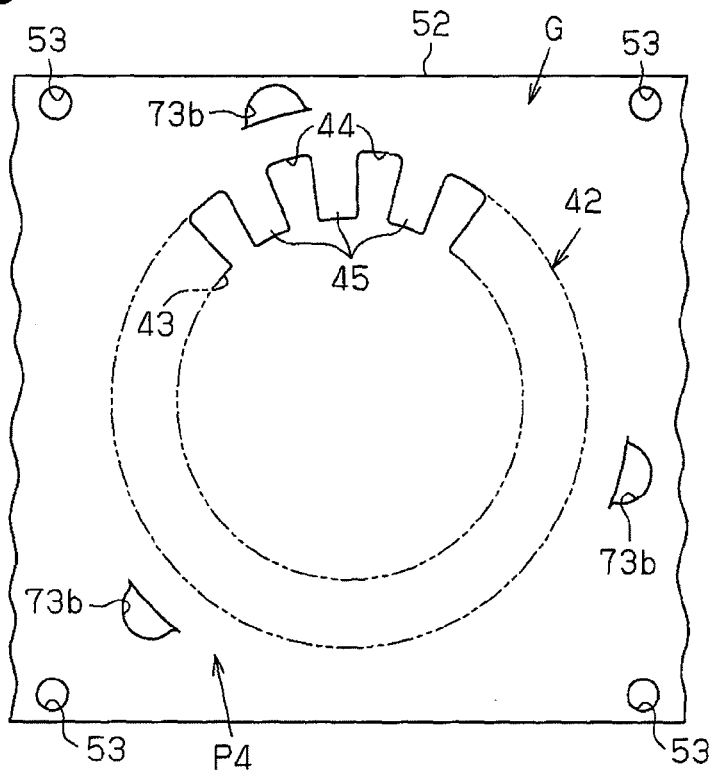
FIG. 12B is a plan view showing the original material in which blank holes have been formed in a fourth pattern at the seventh station.

Next, the subsequent process section on the original material sheet 52, in which the accommodation hole 43 has been punched, is placed between the movable punches 74a, 74b and the fixed die 75 of the seventh station G. In this state, the remaining three movable punches 74b are reciprocated relative to the blades 75b of the fixed die 75. This action punches three blank holes 73b on the process section on the original material sheet 52 at positions displaced by 60 degrees from the blank holes 73a of the third pattern process section P3 as shown in FIG. 12B, thereby forming a fourth pattern process section P4. The blank holes 73b nullify the formation of projections 46 by projection forming blades 81b on the movable punch 79, when the outer circumference and the projections 46 of the stator core piece 42 are formed by the movable punch 79.

In this manner, at the seventh station G, the original material sheet 52 is moved by a predetermined pitch at a time, and the movable punches 74a, or every other punch, and the other three movable punches 74b are actuated alternately. This action alternately forms the blank holes 73a of the third pattern process section P3 shown in FIG. 12A, and the blank holes 73b of a fourth pattern process section P4 as shown in FIG. 12B.

Figure 13:
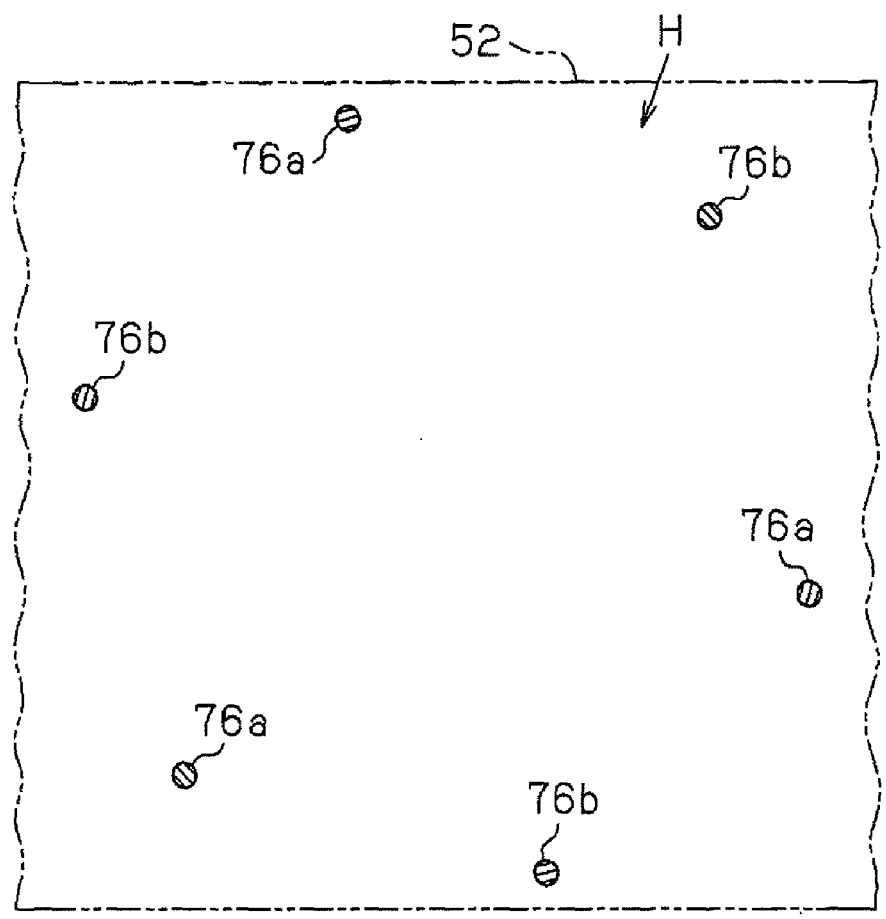
FIG. 13 is a transverse cross-sectional view showing a movable punch used in an eighth station.

As shown in FIGS. 1, 13 and 14, the eighth station H includes a plurality of movable pin-shaped punches 76a, 76b, and a fixed die 77 that includes blades 77a, 77b corresponding to the movable punches 76a, 76b. At the eighth station H, the attachment holes 47 of the projections 46 are punched in the original material sheet 52. The movable punches 76a, 76b are arranged at predetermined intervals on the same circumference. The number of the movable punches 76a, 76b and the number of the blades 77a, 77b are each a multiple of the number of the attachment holes 47 in the stator core piece 42. In the present embodiment, the number of the attachment holes 47 is three, and the number of the movable punches 76a, 76b and the number of the blades 77a, 77b are six, which is the double of three. The movable punches 76a, 76b and the blades 77a, 77b are arranged at angular intervals of 60 degrees.

Figure 14A:
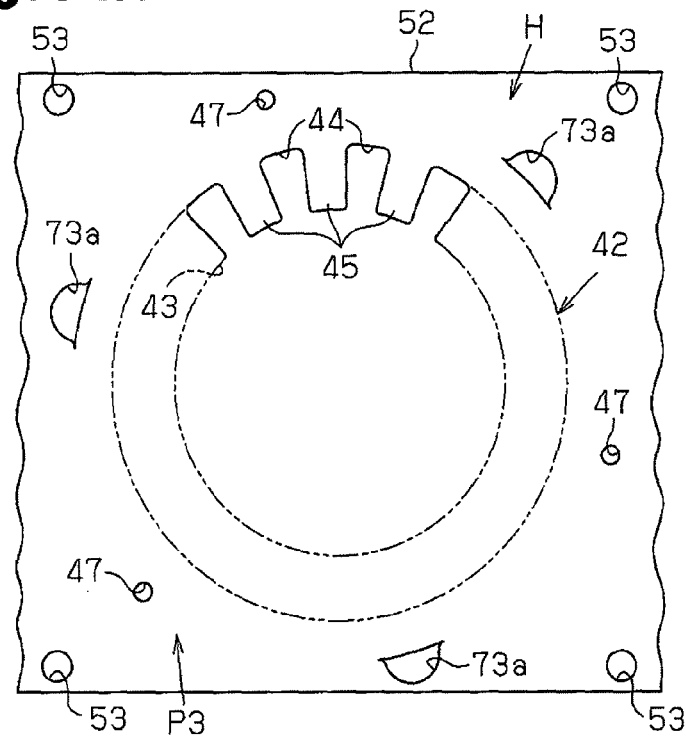
FIG. 14A is a plan view showing the original material in which attachment holes have been punched at the eighth station.

The third pattern process section P3 on the original material sheet 52, in which the three blank holes 73a have been punched, is placed between the movable punches 76a, 76b and the blades 77a, 77b of the fixed die 77 of the eighth station H. In this state, the three movable punches 76a are reciprocated relative to the fixed die 77. This action punches the three attachment holes 47 in the third pattern process section P3 on the original material sheet 52, as shown in FIG. 14A, such that the attachment holes 47 are spaced from the blank holes 73a by the same distance.

Figure 14B:
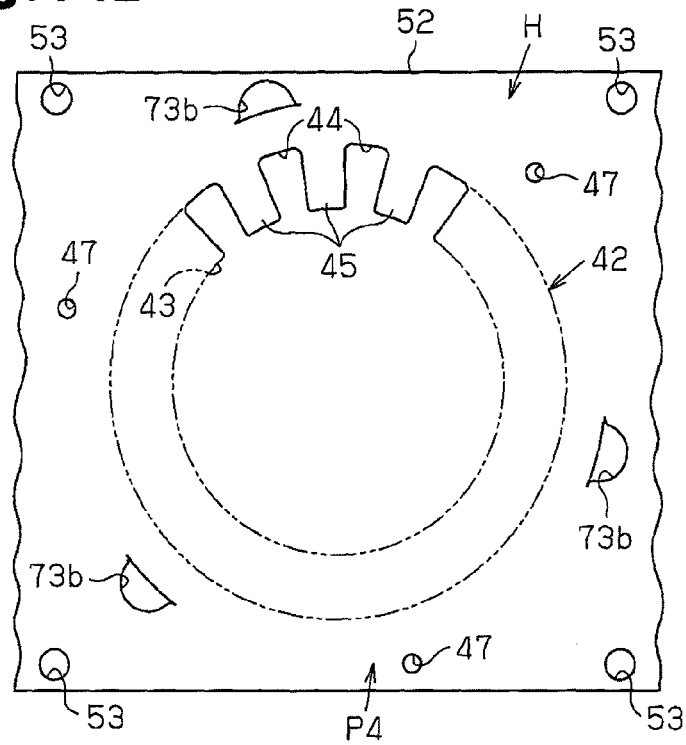
FIG. 14B is a plan view showing the original material, in which attachment holes have been punched in a pattern different from the pattern shown in FIG. 14A, at the eighth station.

The fourth pattern process section P4 on the original material sheet 52, in which the three blank holes 73b have been punched, is placed between the movable punches 76a, 76b and the fixed die 77 of the eighth station H. In this state, the remaining three movable punches 76b are reciprocated relative to the blades 77b of the fixed die 77. This action punches the three attachment holes 47 in the fourth pattern process section P4 on the original material sheet 52, as shown in FIG. 14B, such that the attachment holes 47 are spaced from the blank holes 73b by the same distance.

Figure 15:
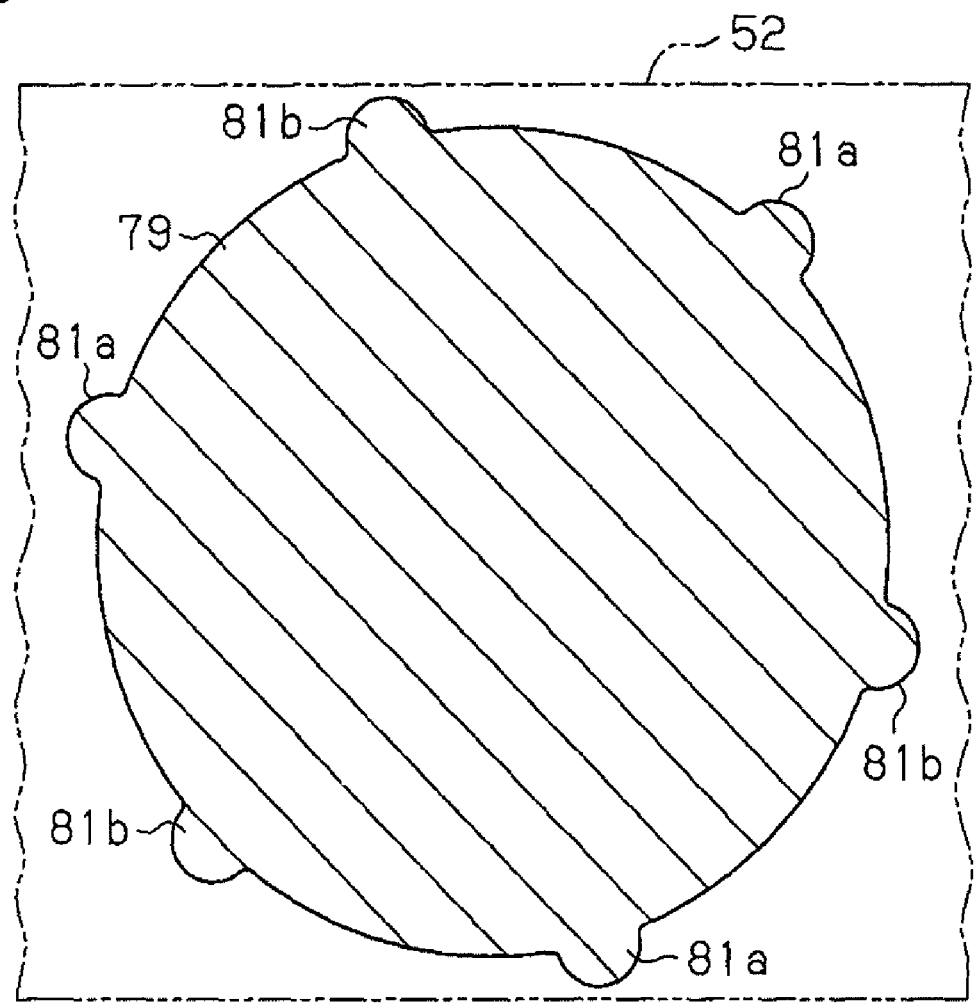
FIG. 15 is a transverse cross-sectional view showing a movable punch used in a ninth station.

As shown in FIGS. 1, 15, and 16, the ninth station I includes a substantially columnar movable punch 79 and a fixed die 80, which corresponds to the movable punch 79. At the ninth station I, the outer circumference 78 and the projections 46 of the stator core piece 42 are simultaneously punched. Projection forming blades 81a, 81b are formed in the outer circumferential surface of the movable punch 79 at equal angular intervals. In this case, the number of the projection forming blades 81a, 81b is a multiple of the number of the projections 46 of the stator core piece 42. In this embodiment, the number of the projections 46 is three, and the number of the projection forming blades 81a, 81b is six, which is a multiple of three. The projection forming blades 81a, 81b are arranged at an angular interval of 60 degrees.

The third pattern process section P3 on the original material sheet 52, in which the attachment holes 47 have been punched, is placed between the movable punch 79 and the fixed die 80 of the ninth station I. In this state, the movable punch 79 is reciprocated relative to the fixed die 80. This action forms the outer circumference 78 and the projections 46 of the stator core piece 42 in the third pattern process section P3 on the original material sheet 52, as shown in FIG. 16A, such that the stator core piece 42 is punched out from the original material sheet 52.

Figure 16A:
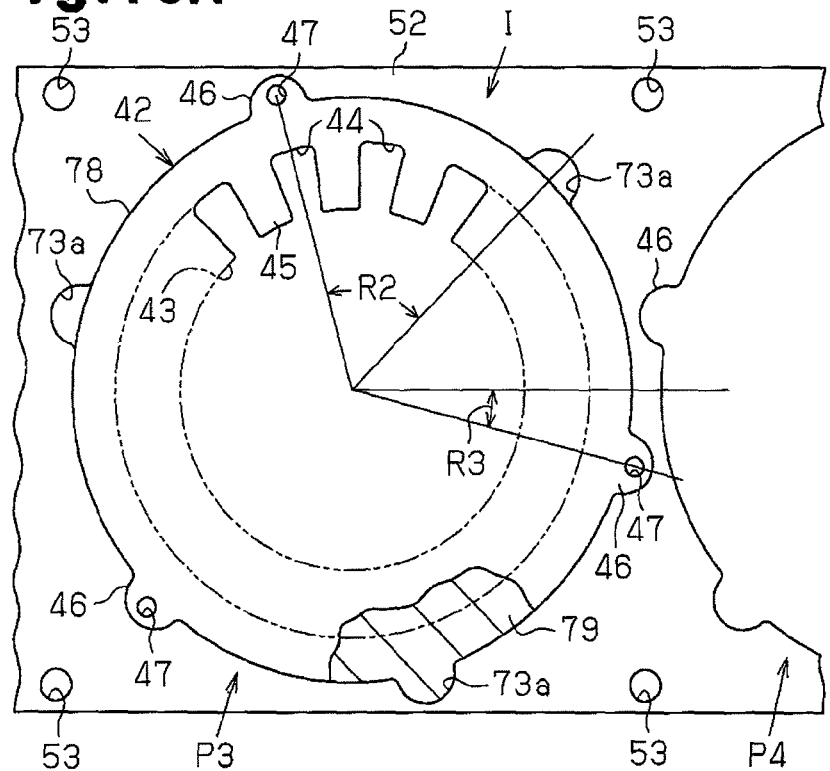
FIG. 16A is a plan view showing the original material in which a stator core piece has been punched with a movable punch at the ninth station.

In this case, as shown in FIGS. 15 and 16A, the blank holes 73a have been formed at positions that correspond to every other projection forming blade 81a on the movable punch 79 in the third pattern process section P3. Accordingly, the formation of the projections 46 by the projection forming blades 81a is nullified. As a result, the other projection forming blades 81b of the movable punch 79 form three projections 46 spaced by intervals of 120 degrees on the outer circumference 78 of the stator core piece 42.

Further, as the original material sheet 52 is moved, the fourth pattern process section P4 on the original material sheet 52 is placed between the movable punch 79 and the fixed die 80 of the ninth station I. In this state, the movable punch 79 is reciprocated relative to the fixed die 80. This action forms the outer circumference 78 and the projections 46 of the stator core piece 42 in the fourth pattern process section P4 on the original material sheet 52, as shown in FIG. 16B, such that the stator core piece 42 is punched out from the original material sheet 52.

Figure 16B:
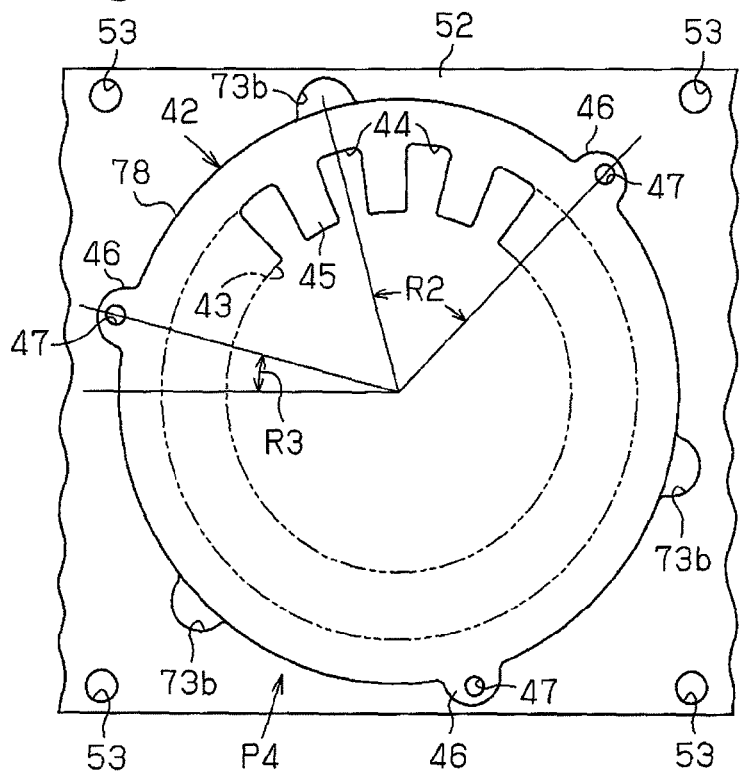
FIG. 16B is a plan view showing the original material in which the stator core piece has been punched with the movable punch at the ninth station.

In this case, as shown in FIGS. 15 and 16B, the blank holes 73b have been formed at positions that correspond to the other projection forming blades 81b on the movable punch 79 in the fourth pattern process section P4. Accordingly, the formation of the projections 46 by the projection forming blades 81b is nullified. As a result, the projection forming blades 81a of the movable punch 79 form three projections 46 on the outer circumference 78 of the stator core piece 42, at positions displaced by 60 degrees from the third pattern process section P3.

The stator core piece 42 punched out from the original material sheet 52 is sent from the fixed die 80 to another process. In the other process, the stator core piece 42 is rotated in one direction or in the opposite direction by a predetermined angle R2 (90 degrees in the present embodiment) relative to another adjacent stator core piece 42, and laminated onto this adjacent stator core piece 42. The projections 46 formed in the respective stator core pieces 42 are located at the same positions. The laminated body is then compressed with a strong force in the direction of the lamination by means of a press. Accordingly, the stator core pieces 42 closely contact each other and are held in close contact by fixing means. The rotated lamination of the stator core pieces 42 is thus performed to obtain the laminated stator core 41 as shown in FIG. 19. The laminated stator core 41 is then assembled to the case of the motor with bolts inserted into the attachment holes 47.

In the processing system 51, when punching the outer circumference 78 and the projections 46 in the stator core piece 42 by the movable punch 79 of the ninth station I, the number of the formed projections 46 is limited by the blank holes 73a, 73b formed on the original material sheet 52 at the seventh station G. That is, at the third and fourth pattern process sections P3, P4, the number of the blank holes 73a, 73b is set to the number obtained by subtracting the number of the projections 46 from the number of the projection forming blades 81a, 81b of the movable punch 79 of the ninth station I (in the present embodiment, 6−3=3). A pair of the projection forming blades 81a or a pair of the projection forming blades 81b correspond to the blank holes 73a or the blank holes 73b formed on the original material sheet 52. Since the projection forming blades 81a or 81b nullify the formation of the projections 46, so that only three projections 46 are formed.

Figure 17:
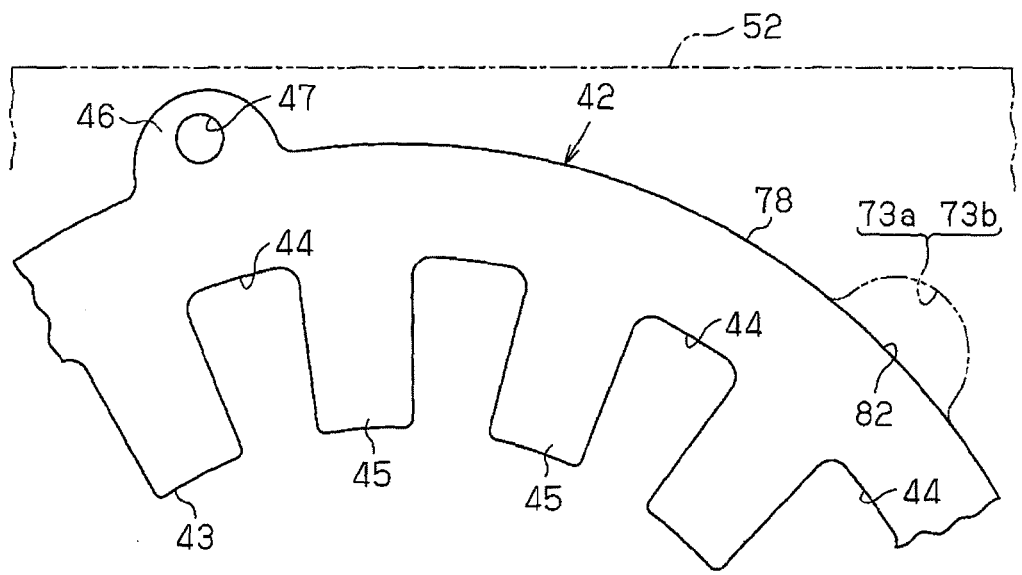
FIG. 17 is an enlarged partial plan view showing the stator core piece punched at the fifth to ninth stations.

Therefore, when the blank holes 73a, 73b are lapped with the outer circumference 78 so that the blank holes 73a, 73b formed in the original material sheet 52 at the seventh station G and the outer circumference 78 formed in the stator core piece 42 at the ninth stage I are connected to each other, no recesses are formed at the proximal portions of each projection 46 as shown in FIG. 17. Thus, when the stator core pieces 42 are laminated while being rotated to form the laminated stator core 41, and the laminated stator core 41 is fixed to the case using the bolts inserted into the attachment holes 47 of the projections 46, excessive stress is not concentrated at the proximal portions of the projections 46.

When the blank holes 73a, 73b and the outer circumference 78 of the stator core piece 42 are lapped with each other, a recess 82 is formed at a position corresponding to the blank holes 73a, 73b that have nullified the formation of the projections 46 on the outer circumference 78 of the stator core piece 42. However, unlike the proximal portions of the projections 46, the recess 82 does not contribute to the fixation of the laminated stator core 41 and the case. Therefore, stress is not concentrated at the recesses 82.

Further, in the processing system 51, after the rotor core piece 32 is punched out from the original material sheet 52 at the first to fourth stations A to D, a stator core piece 42 is punched from a part outside of the hollowed hole 70 on the same original material sheet 52 at the fifth to ninth stations E to I. Further, as shown in FIGS. 16A and 16B, between the third and fourth pattern process sections P3, P4, one of the projections 46 on the stator core piece 42 is inclined relative to the longitudinal direction of the original material sheet 52 by a predetermined angle R3 (15 degrees in the present embodiment). In this state, the projections 46 of the process sections P3, P4 are formed to be close to each other. This configuration increases the yield of the operation for punching the rotor core pieces 32 and the stator core pieces 42 from the original material sheet 52.

The punching method according to this embodiment has the following advantages.

(1) When punching out, from the original material sheet 52, the rotor core piece 32 having the positioning projections 34 on the inner circumference and the stator core piece 42 having the attaching projections 46 on the outer circumference, no recesses are formed at the proximal parts of the projections 34, 46. Therefore, when the punched out rotor core pieces 32 are laminated while being rotated to form the laminated rotor core 31, and the position of the laminated rotor core 31 is determined relative to the rotary shaft using the projections 34, or when the stator core pieces 42 are laminated while being rotated to form the laminated stator core 41, and the laminated stator core 41 is fixed to the case using the projections 46, sufficient fixation strength is ensured while preventing excessive stress concentrating on the proximal portions of the projections 34, 46.

(2) Even if the core pieces 32, 42 are punched out from the original material sheet 52 such that the blank holes 56a, 56b, 73a, 73b overlap with the inner circumference of the rotor core piece 32 and the outer circumference of the stator core piece 42, recesses are formed only in sections away from the proximal portions of the projections 34, 46. Since stress is not concentrated on the recesses, the strength is not reduced.

(3) Unlike the conventional art, no U-shaped opening needs to be formed. The proximal portions of the projections 34, 36 are prevented from being bent. This allows the core pieces 32, 42 to be accurately laminated while being rotated.

(4) The rotor core piece 32 and the stator core piece 42 are coaxially punched out from the original material sheet 52. This reduces wasted part of the original material sheet 52, and thus allows efficient use of the original material sheet 52.

The above illustrated embodiment may be modified as follows.

The rotor core pieces 32 and the stator core pieces 42 may be punched from different original material.

When punching the rotor core piece 32, the blank holes 56a, 56b may be formed at the same station as the storage holes 35 for receiving permanent magnets, or at the station prior to that station.

When punching out the stator core piece 42, the blank holes 73a, 73b may be formed at the same station as the slits 44 for coils, or at the station prior to that station.

When punching out the stator core piece 42, the blank holes 73a, 73b may be formed at the same station as the accommodation hole 43 or at a station prior to that station.

To punch the projections 34, 46, the number of the blades 61a, 61b, 81a, 81b is double the number of the projections 34, 46. However, the number of the blades may be three times the number of the projections, or a greater integral multiple of the number of the projections. Alternatively, the number of the blades may be a non-integral multiple of, for example, 1.5 times the number of the projections. In this case also, if the rotation angle of the rotor core piece 32 or the stator core piece 42 is adjusted at the rotated lamination, the rotor core pieces 32 or the stator core pieces 42 can be laminated while allowing the projections 34, 46 to be aligned.

Instead of forming the rotor core pieces 32 or the stator core pieces 42, the present invention may be applied to cases where punching other types of plate pieces from an original material sheet.

The invention claimed is:

1. A method for punching before performing rotated lamination, wherein a plate piece having on a circumference thereof a plurality of projections is punched out from a thin plate-like original material before the plate piece is rotated relative to and laminated onto another plate piece, the method comprising:
   using a plurality of projection forming blades the number of which is greater than the number of the projections of the plate piece;
   before punching out the plate piece from the original material, forming in the original material one or more blank holes for nullifying the formation of one or more of the projections at positions corresponding to one or more of the projection forming blades; and
   changing the position of the blank hole as the punching of the plate piece from the original material progresses.

2. The method for punching before performing rotated lamination according to claim 1, wherein the number of the projection forming blades is a multiple of the number of the projections formed on the plate piece.

3. The method for punching before performing rotated lamination according to claim 1, wherein the number of the blank holes is a number obtained by subtracting the number of the projections from the number of the projection forming blades.

4. The method for punching before performing rotated lamination according to claim 1, wherein the plate pieces are laminated to form a rotor of a motor, each plate piece having an annular shape as a whole, the projections being formed on the inner circumference of each plate piece, a rotary shaft of the motor being inserted in the rotor, grooves being formed in the outer circumferential surface of the rotary shaft, and the projections being engaged with the grooves of the motor.

5. The method for punching before performing rotated lamination according to claim 1, wherein the plate pieces are laminated to form a stator of a motor, each plate piece having an annular shape as a whole, the projections being formed on the outer circumference of each plate piece, and the projections being fixed to a case of the motor.

6. The method for punching before performing rotated lamination according to claim 5, wherein the plate pieces include first and second annular plate pieces that are punched out from the same original material, the first plate piece forming the rotor of the motor, and the second plate piece forming the stator of the motor, wherein the second plate piece is punched out from a part of the original material that is outside of the first plate piece.

7. The method for punching before performing rotated lamination according to claim 6, wherein the first plate piece and the second plate piece are coaxially punched out from the original material.

8. The method for punching before performing rotated lamination according to claim 1, wherein, in order to change the positions of the blank holes, a first pattern process section is formed on the original material by punching the blank holes, and thereafter, a second pattern process section is formed on the original material by punching blank holes at positions different from the blank holes of the first pattern process section.

9. The method for punching before performing rotated lamination according to claim 1, wherein the projections are formed at equal intervals along the circumference of the plate piece.

* * * * *